United States Patent [19]

Ackeret

[11] 4,055,308
[45] Oct. 25, 1977

[54] FOOD COMMINUTING DEVICE

[75] Inventor: Peter Ackeret, Kusnacht, Switzerland

[73] Assignee: Salter Housewares Limited, West Bromwich, England

[21] Appl. No.: 661,477

[22] Filed: Feb. 26, 1976

[30] Foreign Application Priority Data

Feb. 20, 1975 United Kingdom ............... 7946/75

[51] Int. Cl.$^2$ ............................................. B02C 18/18
[52] U.S. Cl. .................................. 241/100; 241/273.1
[58] Field of Search ................... 241/92, 93, 100, 168, 241/273.1, 273.2, 273.3, 273.4

[56] References Cited

U.S. PATENT DOCUMENTS

| 555,834 | 3/1896 | Taylor | 241/273.1 |
| 1,160,043 | 11/1915 | Clark | 241/273.1 |

Primary Examiner—Granville Y. Custer, Jr.
Attorney, Agent, or Firm—Lowe, King, Price & Markva

[57] ABSTRACT

A food comminuting device comprises a bowl type receptacle in combination with a comminuting appliance designed to engage and fit over the open mouth of the bowl. The comminuting appliance has a frame which carries a plurality of comminuting units having different comminuting characteristics which can selectively be moved and brought into use in a predetermined operative working position such that the fragments of comminuted food fall freely into the bowl. The frame also provides a protective guard shielding at least the comminuting unit or units not in use thereby reducing risk of accidental contact of the latter with the user of the device, and guide means for guiding food bodies manually reciprocated in engagement with a selected comminuting unit in the operative working position.

31 Claims, 18 Drawing Figures

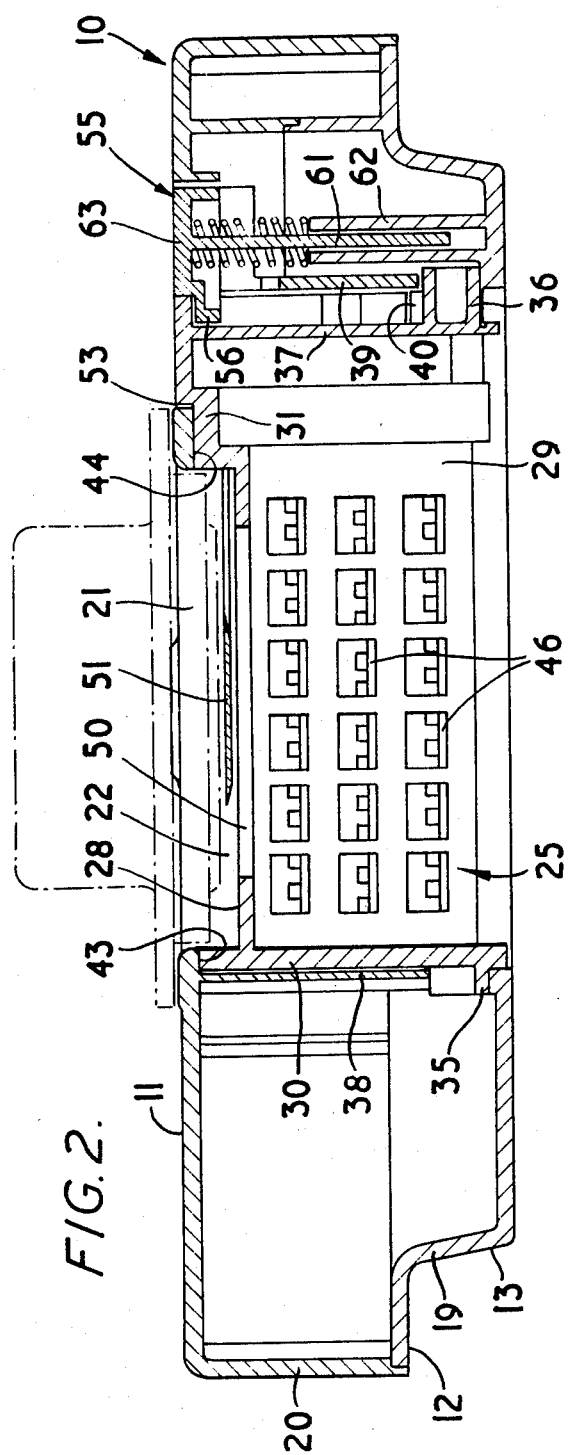
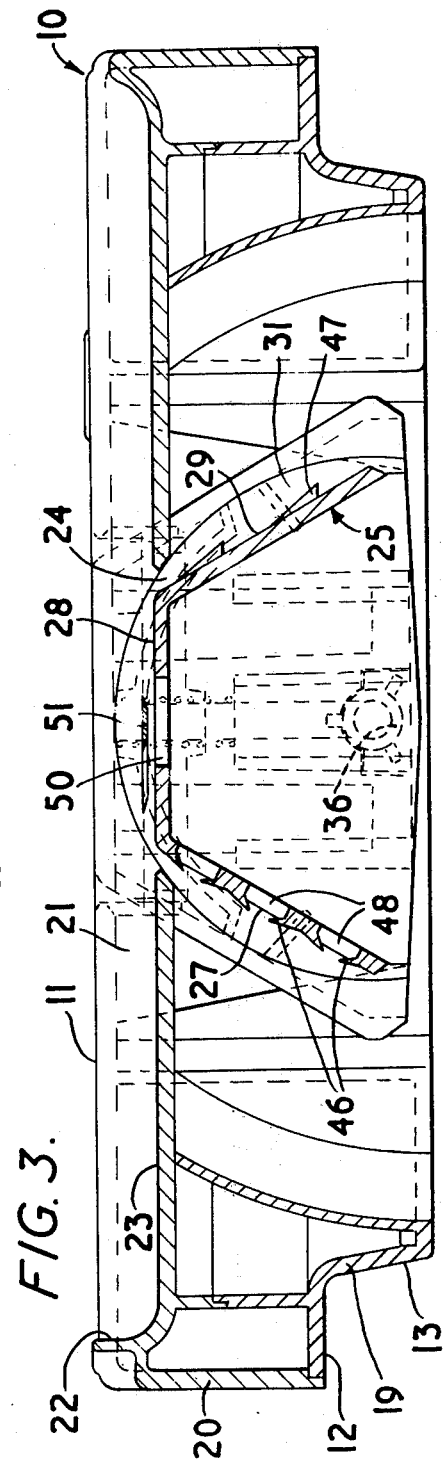
FIG. 2.
FIG. 3.

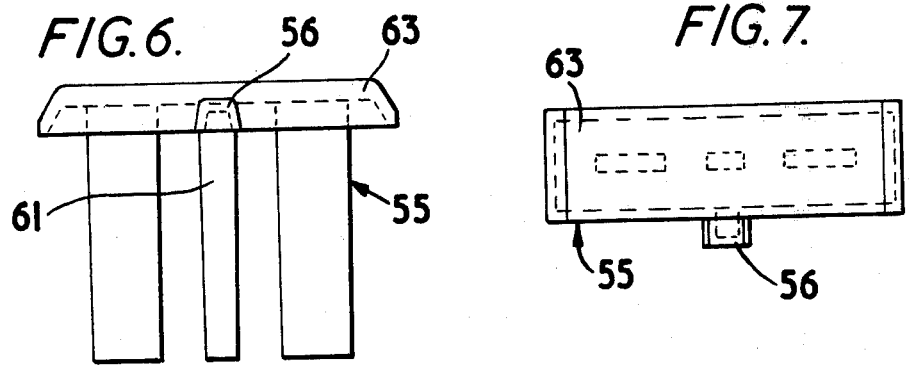
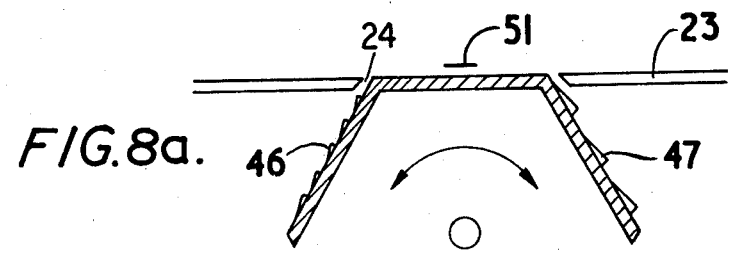
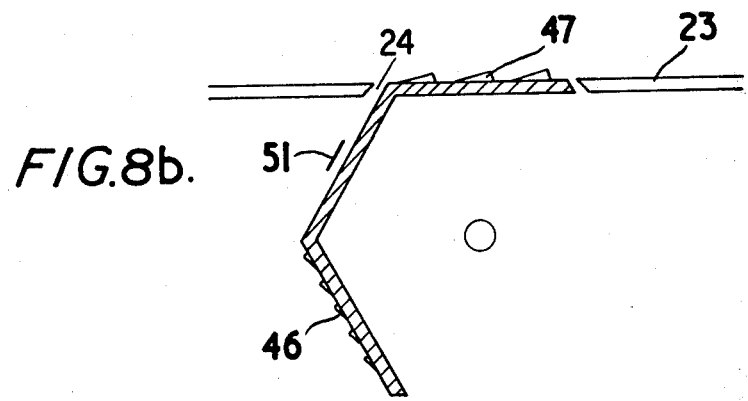
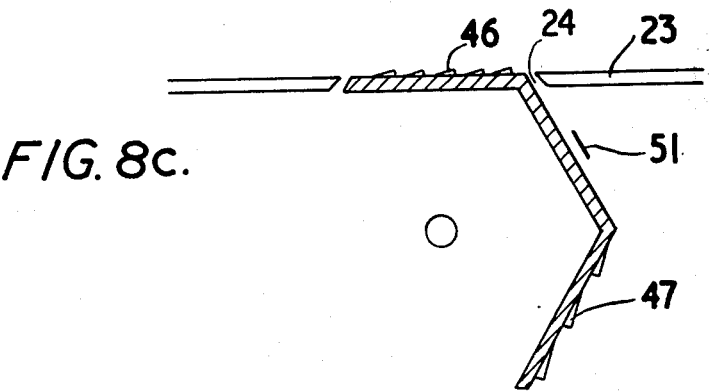

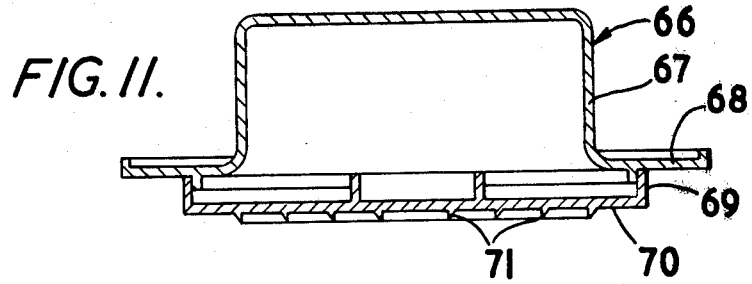
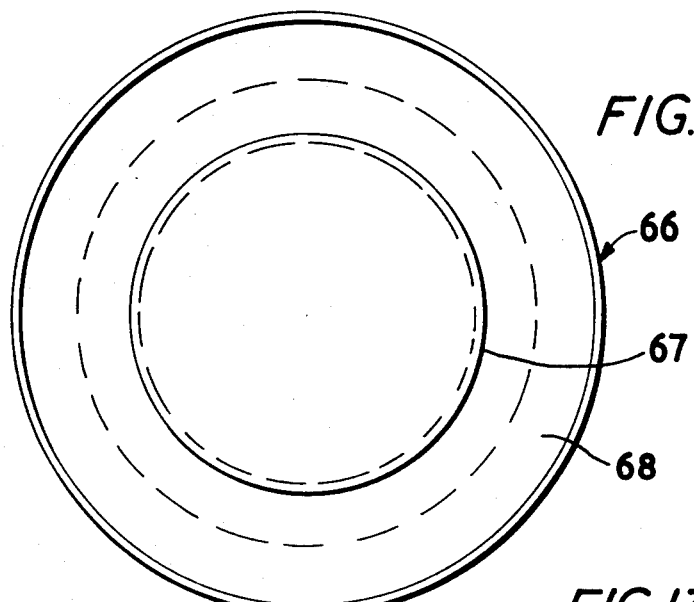
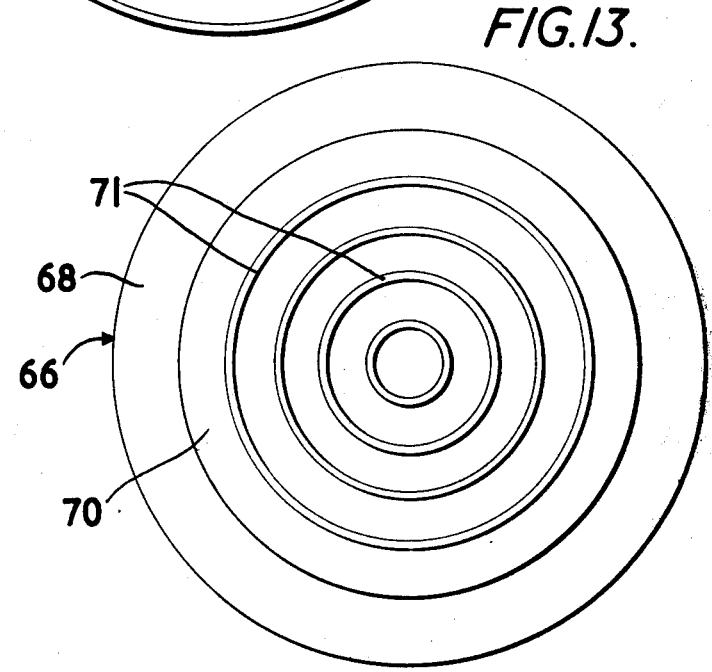

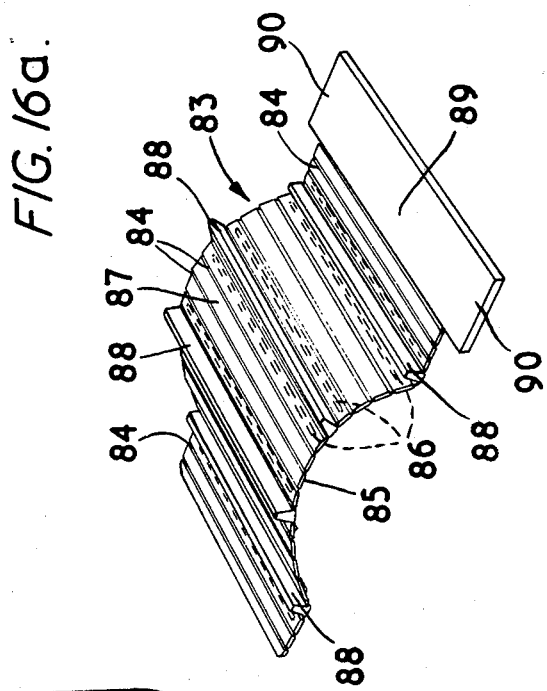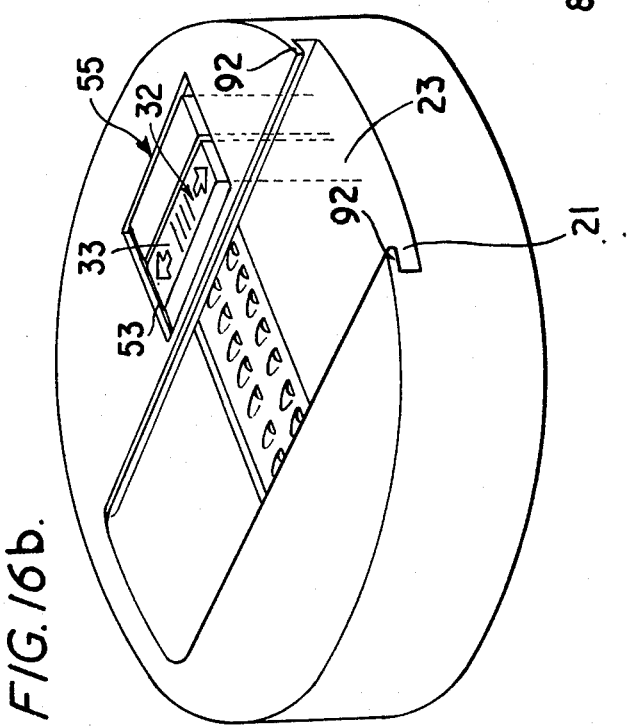

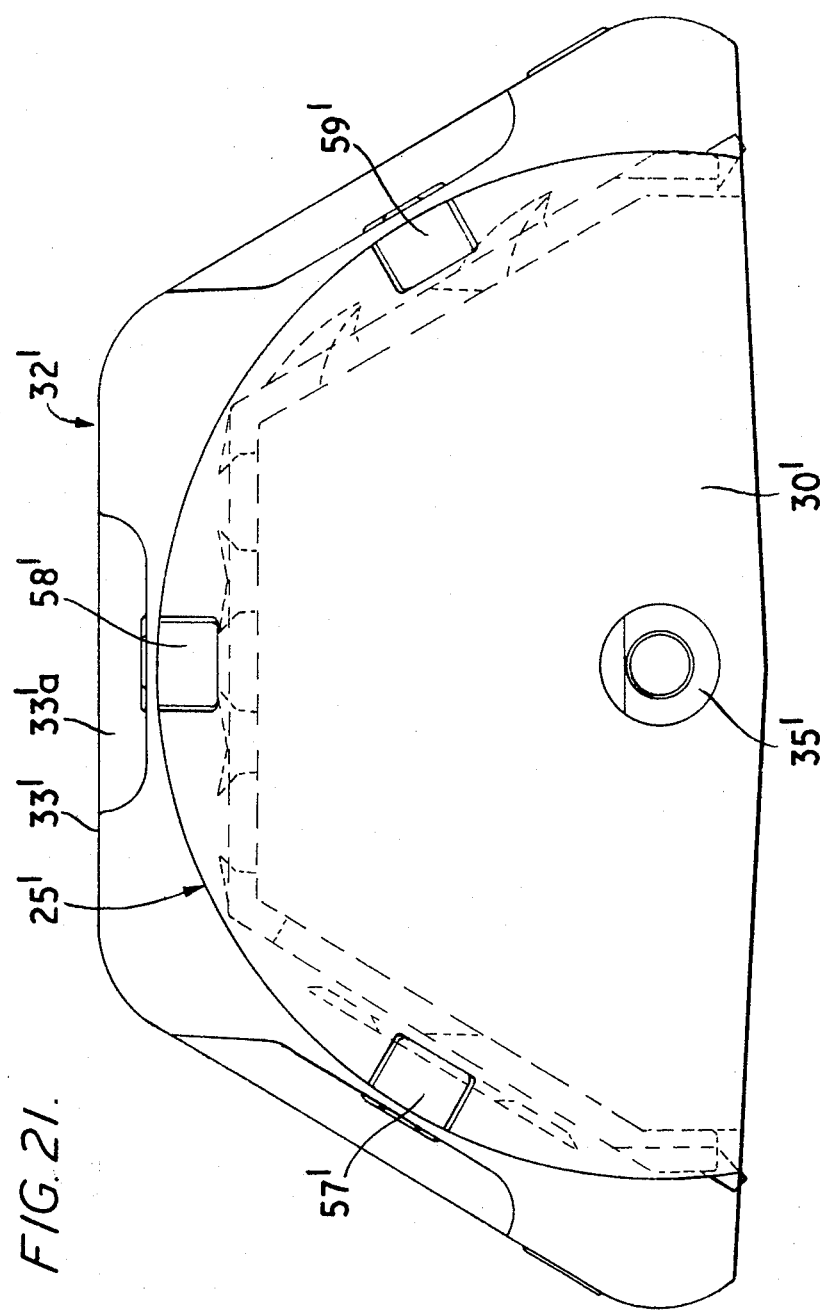

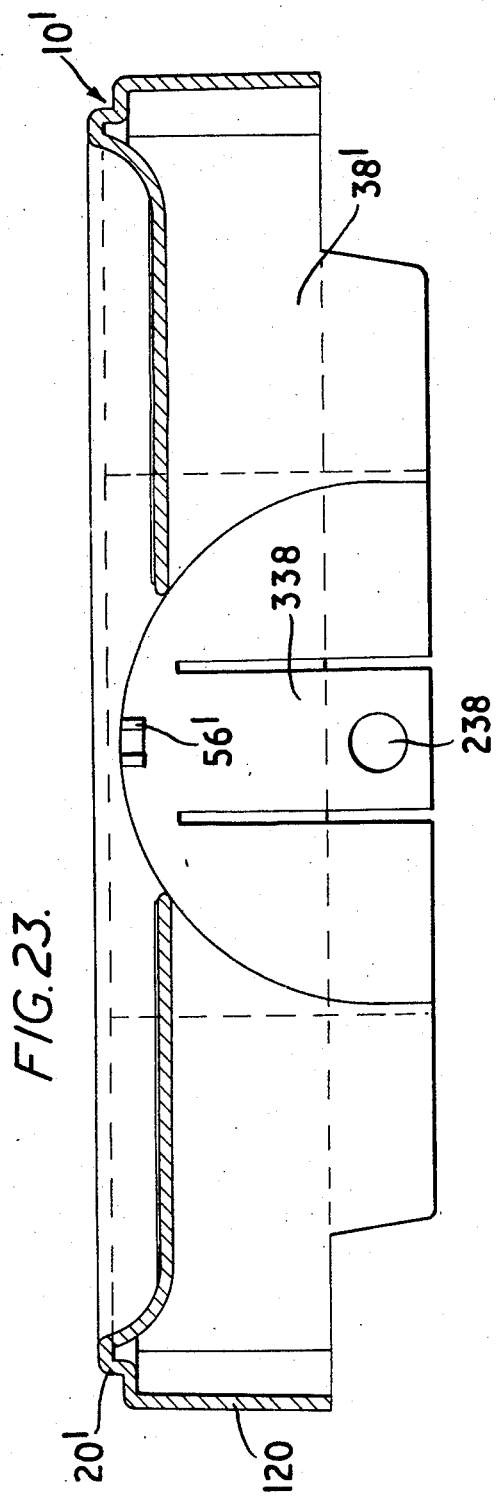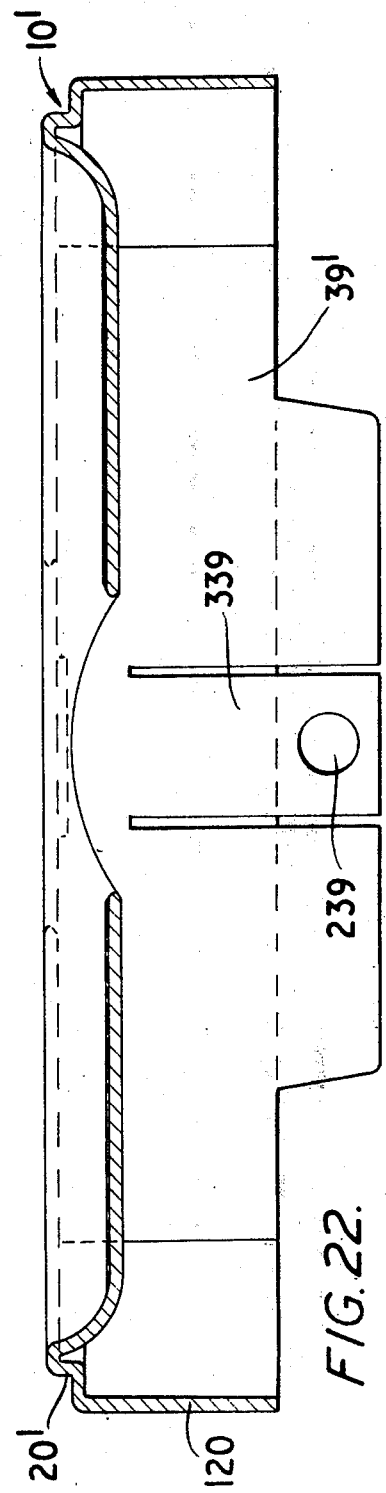

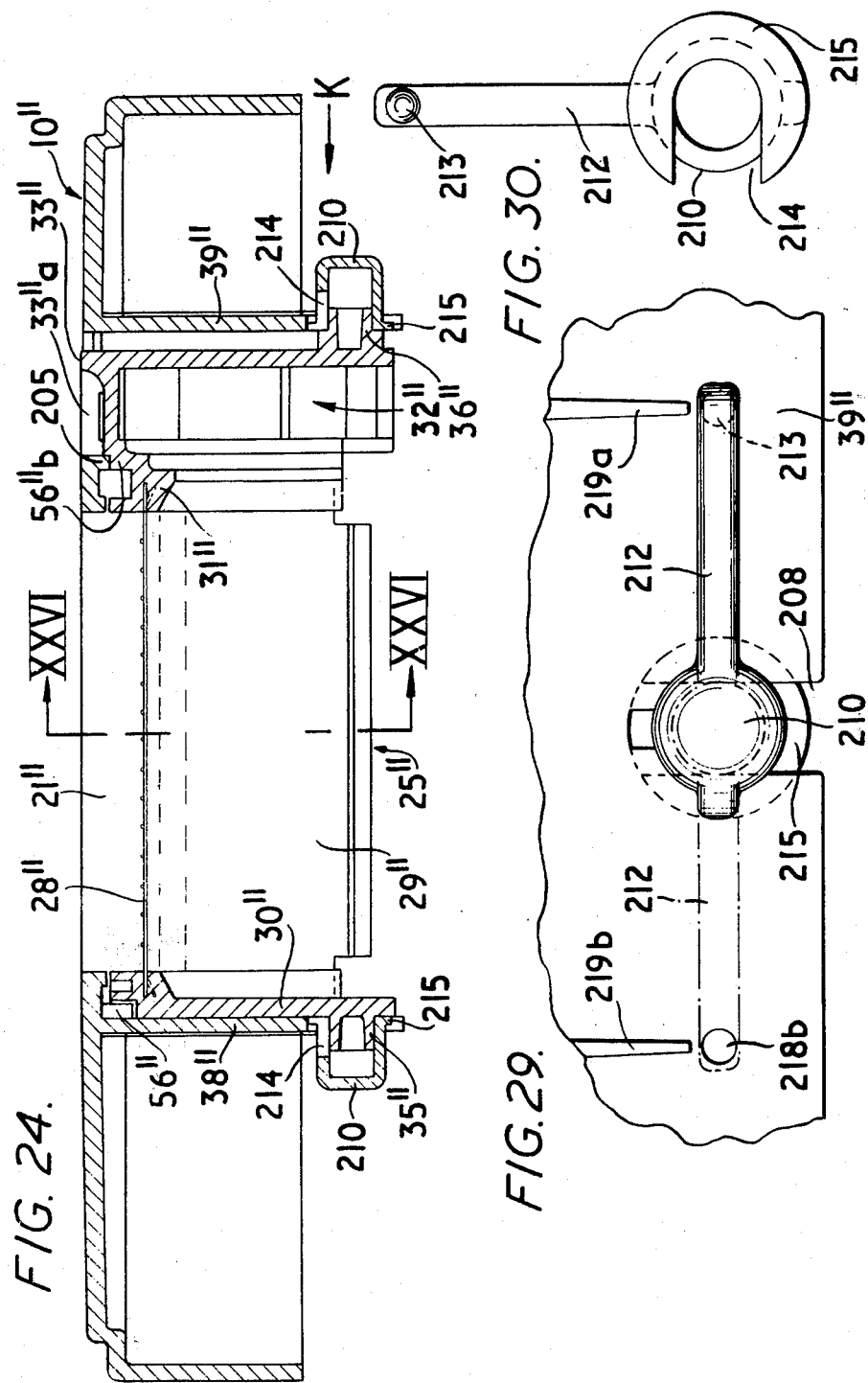

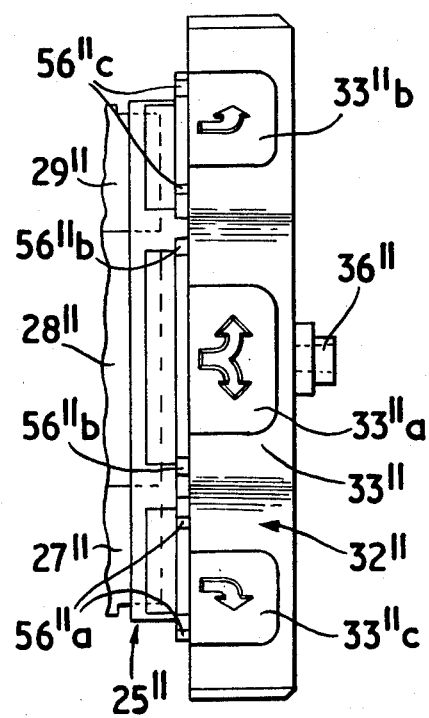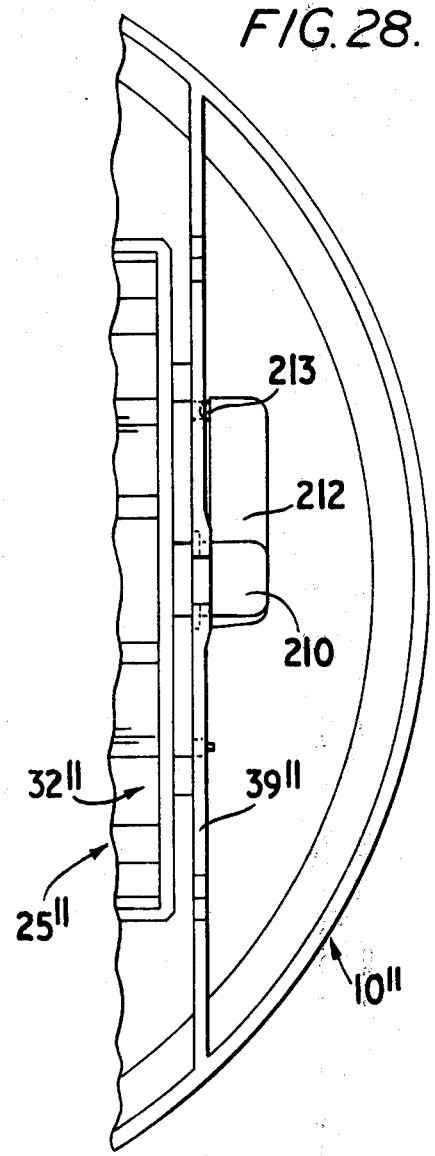

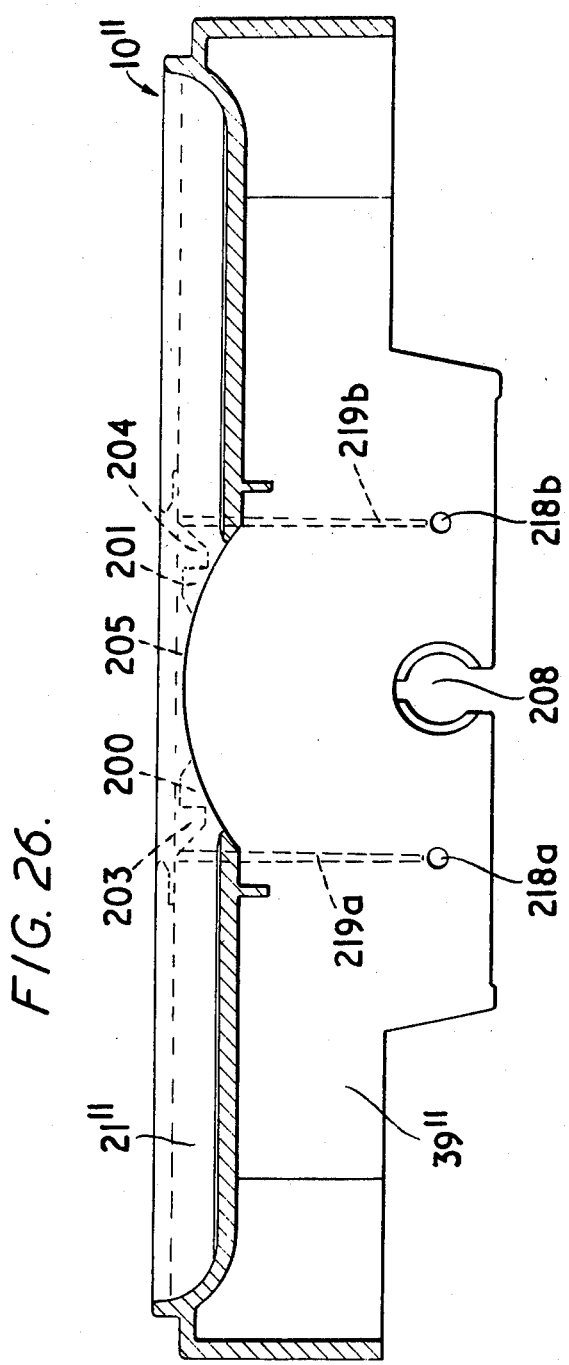

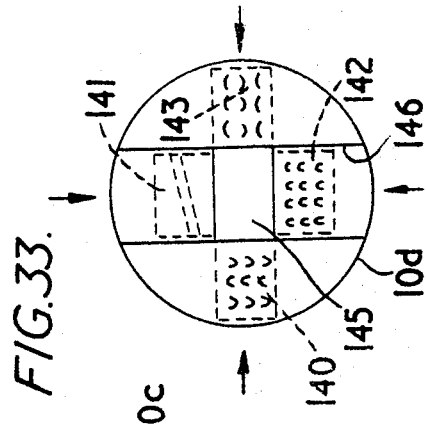
FIG.33.
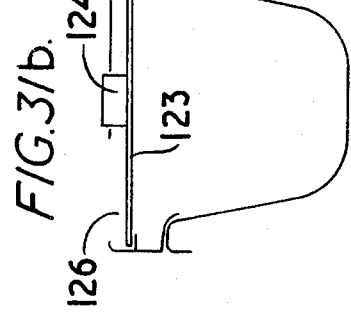
FIG.31b.
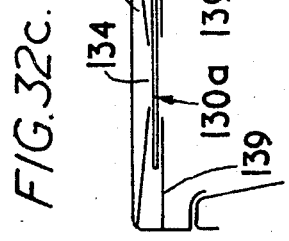
FIG.32c.
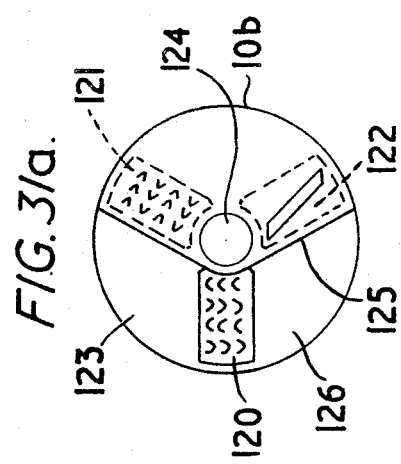
FIG.31a.
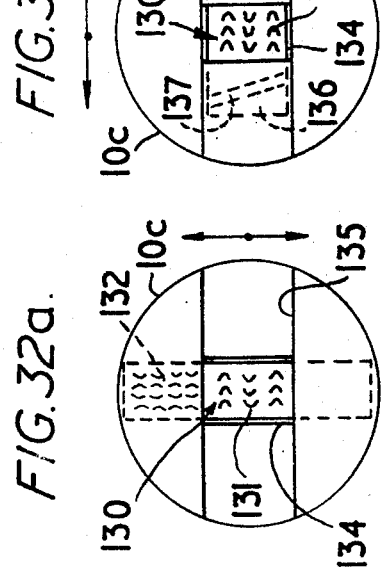
FIG.32b.
FIG.32a.

FOOD COMMINUTING DEVICE

BACKGROUND OF THE INVENTION

The present invention relates to an appliance for comminuting solid food bodies, as by rasping, grating or cutting, carried out by manually reciprocating the food bodies under pressure over a comminuting member so that the comminuted food material drops through apertures therein.

Such appliances of the basic form defined above have for long been in common use in kitchen operations concerned with the preparation of food. They are, for example, used for the slicing of cucumbers and tomatoes, and shredding or grating of root vegetables, potatoes, cheese and other solid food bodies.

Known appliances of the above kind generally comprise a sheet metal or plastic member having comminuting elements in the form of a blade cutter or cutters for slicing and serrations or teeth for grating and shredding. In some cases, comminuting elements of two or more different types have been provided in the one appliance disposed in different static locations for selective use, but many such composite appliances are rather inconvenient and are not always entirely safe for a housewife to use.

It is accordingly an object of the present invention to provide an improved structural form of food comminuting appliance which can provide a high level of convenience and efficient operation for the user.

SUMMARY OF THE INVENTION

More specifically, the invention provides an appliance for comminuting solid food bodies by rasping, grating or cutting carried out by manually reciprocating each food body under pressure over a comminuting unit of a comminuting member so that the comminuted food material drops through apertures therein, in which the comminuting member is supported upon a frame having a working aperture therein. The comminuting member comprises at least two substantially flat comminuting units having dimensions commensurate with those of the working aperture of said frame. Each unit has comminuting characteristics and respectively extends in planes disposed in angular relationship to one another. The comminuting member is mounted upon said frame by swivel bearings defining a pivot axis extending parallel to and equidistant from said comminuting units. The mounting permits the comminuting member to be swivelled relative to the frame so that any one of said comminuting units can selectively be brought into an operative working position in registry with said working aperture in which position it can be locked by releasable locking means associated with said comminuting member.

Preferably, it is arranged so that the comminuting units are each accessible for use only when brought into registry with said working aperture and, at any one time, only one comminuting unit is so accessible. The other comminuting units are then situated protectively under the frame.

The selection of any desired comminuting action may be effected simply by unlocking, turning and re-locking the comminuting member to bring the required comminuting unit into the operative working position. This action need only involve a single manual manipulation.

In preferred embodiments, the frame is also adapted to fit upon and form a cover for the open top of a receptacle provided for collecting the comminuted material. The receptacle may be a bowl type container having an open mouth surrounded by a rim portion of complementary configuration to that of the frame so that the frame seats in located position upon the bowl container. This inter-related association with such receptacle further facilitates use of the appliance since the user need only hold the receptacle with the appliance fitted thereon, without having to check continuously whether the comminuted food is being properly collected. When simply holding a food comminuting appliance above a receptacle as has generally been necessary with previously known devices it is usually almost unavoidable, at least in the case of some foods such as dry bread, for some of the comminuted material to fall clear of the receptacle.

In most cases, three different types of comminuting units will be sufficient, one designed for slicing, one for coarse rasping or shredding, and one for fine grating. With three such different comminuting units, adjacent units may advantageously be disposed at an angle, relative to one another, within the range 100° to 140°, with a value of 120° being a preferred value. If too small an angle is chosen for the angular relationship between adjacent units, there may be some risk of the comminuted material produced settling on an adjacent comminuting unit not in use at that time instead of dropping clear into an underlying receptacle. And, if too large an angle is chosen for the angular relationship between adjacent units, the size of the comminuting member is likely to result in the overall height of the complete appliance becoming so large as to cause it to be difficult to handle. Low overall height is also desirable so that on storage of the appliance, the frame may serve as a tray and carrier for the inverted receptacle thereby to form a compact storage unit. For the latter purpose, the top surface of the frame is preferably substantially flat and is designed to act as a supporting base upon inverting the appliance into an out of use position.

The appliance may be manufactured economically by producing the comminuting member and/or the frame out of plastic material, and preferably these two parts form the sole structural components of the appliance and are each formed as a single one piece plastic molding.

The locking means for retaining the comminuting member in adjusted position may comprise a projection or projections on the comminuting member adapted for selective engagement with a recess or recess in the frame. Alternatively the projection or projections may be on the frame and the recess or recesses in the comminuting member. And, for releasing such locking means, the comminuting member may be supported upon the frame by at least one flexibly resilient support part, carrying part of a respective swivel bearing, which permits the comminuting member to be displaced axially to effect engagement and disengagement of the locking means.

Further to facilitate operation, the uppermost side of the frame is preferably provided with a guiding track for the solid food bodies to be comminuted, said guiding track extending across and either side of the working aperture. This guiding track may be in the form of a channel recessed into the top surface of the frame. Additionally it may include guiding ribs for the solid food bodies. It may also be adapted to provide a guide for a food body holder pad by means of which the food bodies to be comminuted can be reciprocated manually by pressure applied indirectly through such holder pad, thereby again facilitating handling of the food bodies and reducing any risk of accidental damage through careless or unskillful handling.

BRIEF DESCRIPTION OF DRAWINGS

The invention will now be more particularly described with reference to the accompanying drawings which illustrate, by way of example, two different embodiments.

In said drawings,

FIG. 2 is a vertical cross-sectional view on line II — II of FIG. 1;

FIG. 3 is a vertical cross-sectional view on line III — III of FIG. 1;

FIG. 6 is an elevational view of a press button component of a locking arrangement;

FIG. 7 is a plan view of the press button component;

FIGS. 8a, 8b and 8c are diagrams showing three different operative positions of the comminuting member;

FIG. 11 is a cross-sectional view of a first form of food holder pad member;

FIG. 12 is a top plan view of the food pad holder member;

FIG. 13 is an underside plan of the food holder pad member;

FIGS. 16a and 16b are perspective views showing a third form of food holder pad member including an indication of its manner of use;

FIG. 21 is an elevational end view of the comminuting member component of the structure of FIG. 18, viewed in the direction indicated by arrow L in FIG. 19;

FIG. 22 is a cross-sectional view similar to FIG. 20, taken along line XX — XX of FIG. 18 and looking in the direction of arrow L in FIG. 19, but with the comminuting member removed;

FIG. 23 is a cross-sectional view similar to FIG. 22 but looking in the direction of arrow R in FIG. 19;

FIG. 24 is a vertical cross-sectional view, similar to FIG. 19, of another modified structural form representing a third embodiment;

FIG. 25 is a plan view of one end portion of the comminuting member component in said third embodiment;

FIG. 26 is a vertical cross-sectional view on line XXVI — XXVI of FIG. 24 with the comminuting member component removed;

FIG. 28 is another fragmentary underside plan view showing part of the frame component, and comminuting member component mounted thereon, of the third embodiment;

FIG. 29 is a fragmentary elevational view, on a larger scale and taken in the direction of the arrow K in FIG. 24, showing one of the swivel bearing mountings of the comminuting member component and associated releasable catch means indicated in both the locking or retaining position (full lines) and release position (phantom lines); and FIG. 30 is an elevational view showing the opposite side of the swivel mounting releasable catch member;

FIGS. 31a and 31b are diagrams illustrating a fourth embodiment;

FIGS. 32a, 32b and 32c are diagrams illustrating a fifth embodiment; and

FIG. 33 is a diagram illustrating a sixth embodiment.

DESCRIPTION OF SPECIFIC EMBODIMENTS

Figure 9A:
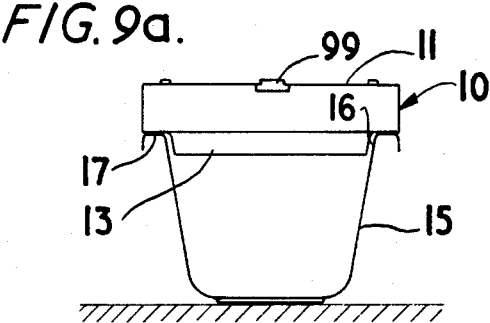
FIGS. 9a and 9b are diagrams illustrating the combination of the comminuting appliance with a complementary bowl container, for use a collector receptacle, in an operative "in-use" condition and in an inverted "out-of-use" condition respectively.
Figure 9B:
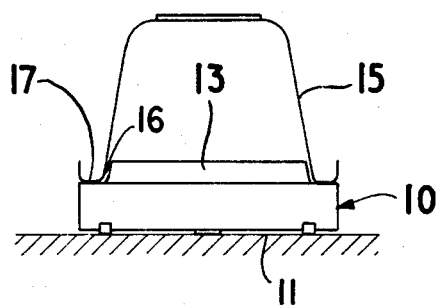

Referring to the drawings, the appliance of the first embodiment comprises a frame 10 having the configuration of a shallow cylindrical hollow casing with a flat surface 11 at the top and a rebated lower peripheral edge which provides an annular downwardly-presented peripheral surface 12 surrounding a centrally disposed slightly tapering cylindrical lower section 13 of smaller diameter. Thus, frame 10 can be fitted to a receptable 15 in the form of a complementary bowl container having a circular section and an open mouth surrounded by a U-section rim portion 17. In use, surface 12 seats on rim portion 17. The lower section 13 forms a locating spigot which engages within the open mouth 16 and prevents lateral displacement as indicated in FIG. 9a. As shown in FIG. 9b, this assembly can be inverted into an out-of-use position for storage so that the device then rests with its flat surface 11 lowermost.

The frame 10 is preferably composed of plastic material and may be molded in two parts including a lower base part 19 and an upper cover part 20. Parts 19 and 20 are secured together during assembly either permanently such as by welding or releasably, such as by clip means.

A shallow channel 21 of rectangular section extends transversely across the top flat surface 11 for substantially the length of a full diameter. One end of the channel 21 is closed by an end wall 22. A rectangular aperture 24, herein termed a "working aperture," is formed mid-length of channel 21 and extends through into the hollow interior of the body structure or frame 10. A hollow drum or turret 25 is rotatably mounted about a horizontal axis in frame 10. The hollow drum or turret 25 comprises a comminuting member and has an arch-like cross-section with a circumference which subtends an angle of slightly more than 180° across the rotational longitudinal axis. The main portion of the drum or turret 25 is of part-hexagonal section, presenting three full facets 27, 28 and 29, and is flanked by a substantially semi-circular end wall 30 at one end. At the other end thereof, a part-cylindrical shaft portion 31 carries an axial extension providing an integral larger diameter boss 32 having a part-polygonal exterior surface presenting flat faces 33.

The durm or turret 25 is rotatably supported by relatively small diameter axially-aligned trunnion or stub axle integral extensions 35 and 36 projecting respectively from the end wall 30 and from an internal end wall 37 within the boss 32. These extensions 35 and 36 seat in bearing apertures provided by internal walls 38 and 39 of the frame 10. The short radial fins 40 over part of the length of the extension 36 serve to limit end play. The end wall 30 also provides a cylindrically curved peripheral surface 42 which mates with an extended complementary cylindrically curved bearing surface portion 43 of the frame 10. The cylindrical peripheral surface of the part-cylindrical shaft portion 31 mates with a complementary cylindrically curved bearing surface 44 of frame 10. Thus, bearing support for the drum or turret 25 is provided over an extensive area.

The facets 27, 28 and 29 of the drum or turret 25 provide or constitute separate comminuting units incorporating different comminuting elements for food grating, shredding or slicing. Thus, the two facets 27 and 29 are provided with grating serrations or teeth 46 and 47 respectively adjacent holes or perforations 48 and 49. Facet 28 has an obliquely-extending transverse aperture or slot 50 above which is mounted, in parallel relationship, a fixed elongate slicer blade 51 fitted at its ends into recesses in the end wall 30 and cylindrical shaft portion 31. As shown, the serrations or teeth 46 are double-edged and relatively small. The serrations or teeth 47 are single-edged and relatively large so as to have coarser characteristics.

Figure 1:
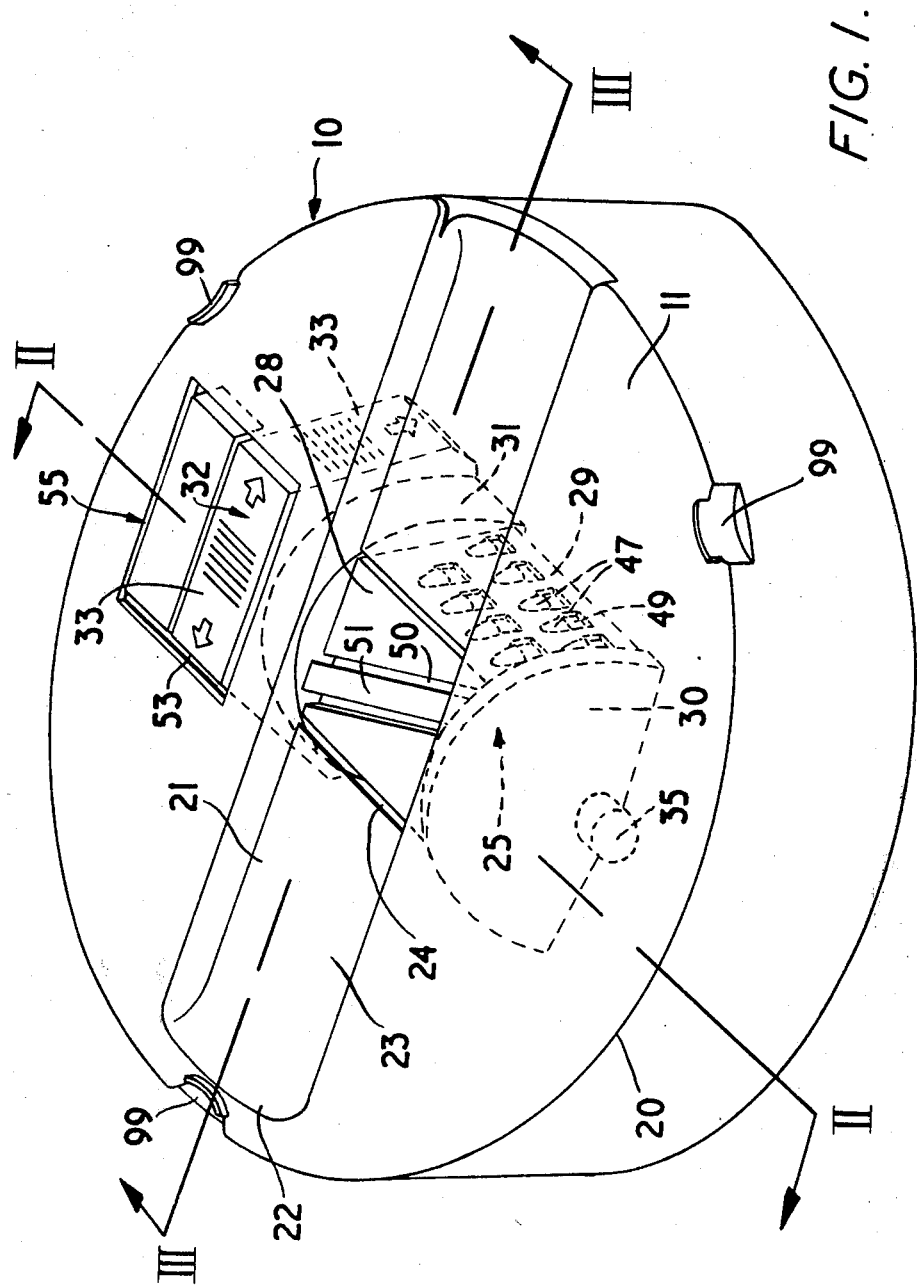
FIG. 1 is a diagrammatic top perspective view of a food comminuting appliance in accordance with a first preferred embodiment of the invention.

Referring to FIGS. 8a, 8b and 8c, when each facet or comminuting unit is in its uppermost position, it lies in the working aperture 24 of the channel guideway 21, as shown in FIG. 1. When each surface is substantially flush with the base 23 of guidway 21, the grating serrations or teeth or slicer blade, as the case may be, then projects upwardly into guideway 21. At the same time, the other facets or comminuting units which are not exposed in the uppermost operational position are covered and protectively shielded by the frame 10. Thus, a protective guard results reducing risk of accidental contact of such out-of-use comminuting units with the user.

Figure 4:
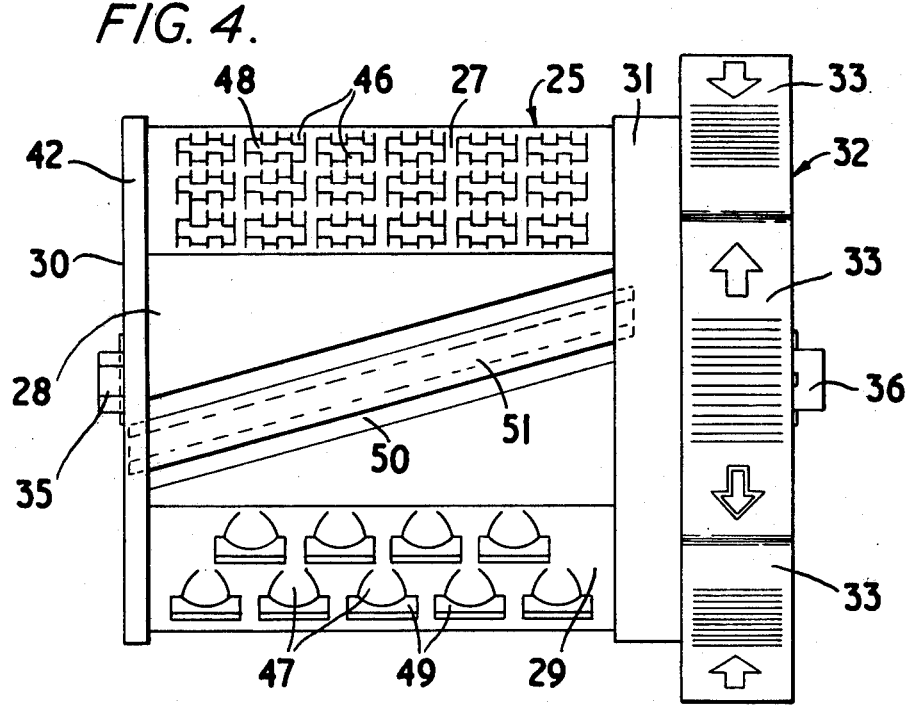
FIG. 4 is a plan view of the comminuting member.

Aperture 53 is in the flat top 11 of frame 10 adjacent one side of the channel guideway 21. The uppermost face 33 of the boss 32 lies within part of aperture 53 so as to be exposed. These faces 33 form convenient finger pads for manipulating the drum or turret 25 so as to move it from one angular position to another. Faces 33 advantageously provided with a surface ribbing and indicia markings as illustrated in FIG. 4.

Figure 5:
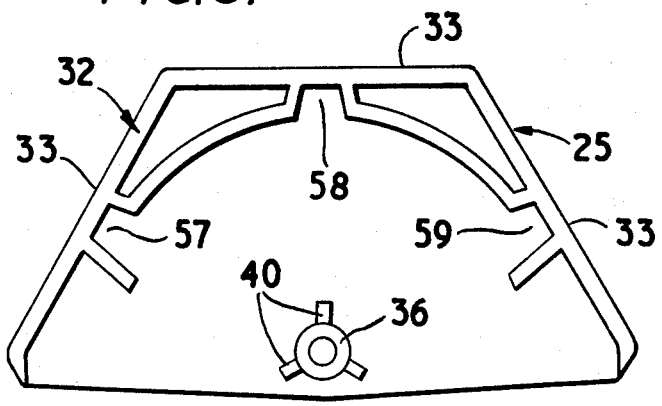
FIG. 5 is an elevational end view of the comminuting member seen in the direction indicated by the arrow in FIG. 4.

Button pad 55 locates and locks the drum or turret 25 in each of its three angular positions which brings one or other of the facets 27, 28 or 29, into the uppermost operational working position. A spring-loaded release press button pad 55 having a lateral locking projection 56 is arranged to engage in one or other of three angularly-spaced complementary locking recesses 57, 58, 59, formed by ribs on the end face of wall 37 (see FIG. 5). The press button pad 55, which is shown in more detail in FIGS. 6 and 7, is a molded plastic body of generally T-shaped cross-section having a center stem portion 61 which is slidably fitted in a vertically upstanding guide 62 of frame 10. When pad 55 is normally engaged with one of the locking recesses, the head portion 63 also lies in the aperture 53 with its upper face, and the adjacent face 33 of the boss 32, lying flush with the surface of the flat top of the frame 10.

The whole of the drum or turret 25, including the grating serrations or teeth 46 and 47 and the boss part 32 may be formed as a one-piece unitary molding in plastic material.

As previously indicated, the device is intended to be used in association with a receptacle consisting of a complementary bowl container 15 upon which it is seated as shown in FIG. 9a. Drum or turret 25 is easily set, by turning after depressing the press button pad 55 and applying finger pressure to the exposed faces 33 of the boss 32, to bring a selected facet 27, 28 or 29, in the uppermost operational working position in the aperture 24, a grating, shredding or slicing operation can be carried out by manually reciprocating a foodstuff body within the channel guideway 21. The comminuted food particles or fragments will normally pass through the holes or perforations, or aperture, of the facet constituting the operative comminuting unit and will be collected within the bowl container 15.

The appliance is also advantageously provided with a separate food holder pad 66 for facilitating handling of foodstuff bodies as previously mentioned. See FIGS. 11 and 12 and the broken lines in FIG. 2. Pad 66 comprises a rigid cylindrical body of plastic material having an upper handle portion 67, an annular projecting flange 68 and a lower portion 69 providing a lower pad face 70 formed with a series of circular shallow ribs 71. In use, holder pad 66 is placed on top of a foodstuff body in the channel guideway 21 and enables pressure to be conveniently applied to the foodstuff body which is held by the ribs 71 which form gripping projections. When the foodstuff body has a small size, the lower portion 69 of pad 66 body fits and locates between the side walls of the channel guideway 21. As the foodstuff body wears away, flange 68 will finally engage the adjacent portions of the flat top 11 just before the pad face 70 contacts the working elements of the comminuting unit in use.

Figure 14:
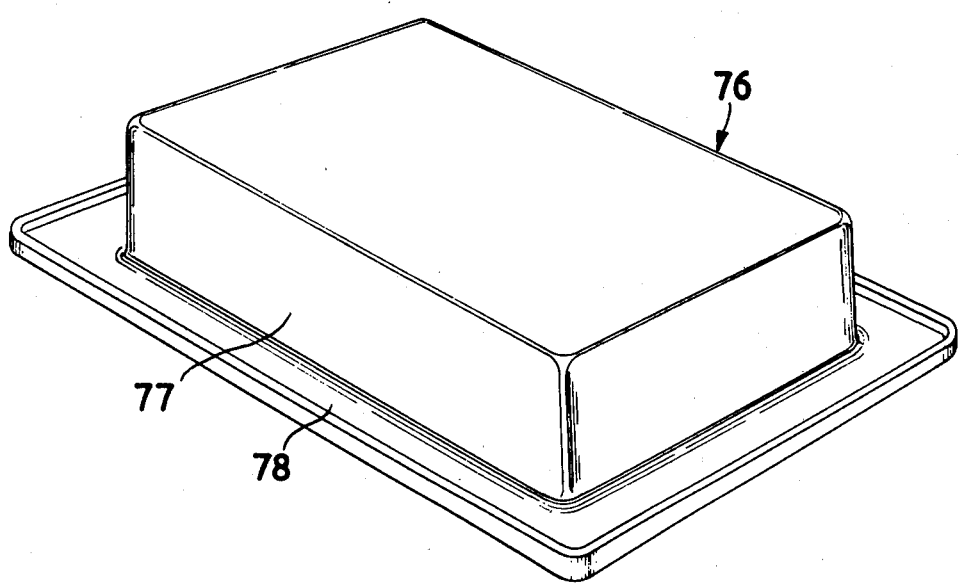
FIG. 14 is a top perspective view of a second form of food holder pad member.
Figure 15:
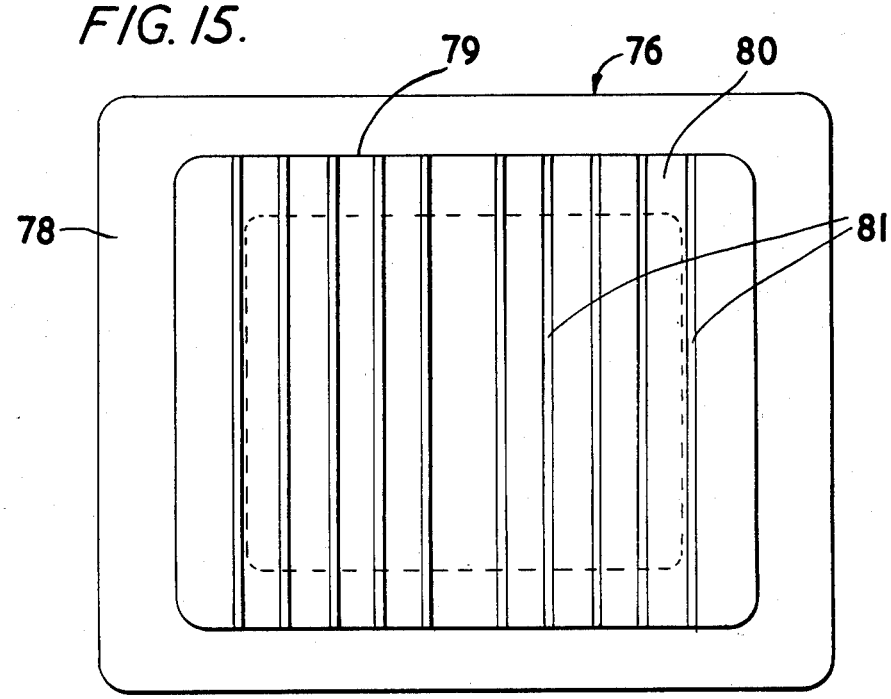
FIG. 15 is an underside view of the food holder pad member of FIG. 14.

The alternative form of food holder pad 76 shown in FIGS. 14 and 15 has a molded plastic body of rectangular configuration instead of being cylindrical. Pad 76 has an upper handle portion 77, a surrounding projecting flange 78 and a lower portion 79 providing a pad face 80 which in this case has a series of parallel shallow food-gripping ribs 81.

The further form of food holder pad 83 is illustrated in FIGS. 16a and 16b and comprises an elongated rectangular flexible piece of relatively rigid plastic material. The flexibility is produced by a series of transverse grooves 84 so that the pad can readily fold transversely along its length. One face 85 is formed with a plurality of shallow integral transverse ribs 86 which serve as food gripping projections. The opposite face 87 has a number of larger integral transverse ribs 88, except for an end plate portion 89 which has smooth surfaces. The end plate portion 89 also has an increased width produced by integral projecting side lugs 90, 90.

Holder pad 83 is intended to be used, as indicated in FIG. 16b, with a channel guideway 21 which is slightly modified by having inturned flanges 92, 92 extending along each side in spaced relationship with the base 23. The lugs 90, 90 of the end plate portion then engage under the flanges 92, 92 serving as retaining guides. The remainder of pad 83 is folded over a foodstuff body placed in the channel guideway with the face 85 presented downwardly. The holder pad 83 can then readily be manipulated by the fingers of the operator being placed against the opposite upwardly presented face 87. The finger tips engage against ribs 88 so as to press down on the foodstuff body and at the same time to move it back and forth along the channel guideway 23.

The comminuting appliance hereinabove described in detail is extremely convenient to use, versatile with the choice of cutters or comminuting elements provided, and in combination with the complementary bowl container 15 forms a very compact assembly which, for storage, can be inverted as indicated in FIG. 9b.

Figure 10:
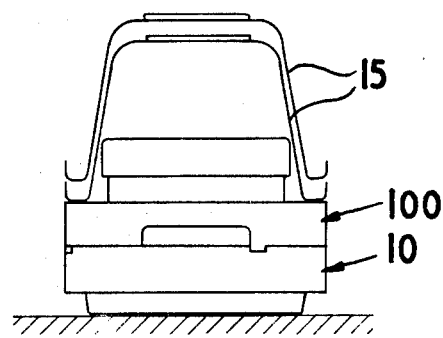
FIG. 10 is a diagram illustrating a further combination of the comminuting appliance with a weighing balance of complementary configuration and with a pair of complementary bowl containers forming a compact assembly for storage.

Furthermore, the appliance as described is also designed to be stacked and assembled in combination with a weighing balance or scale of the form described in our British patent specification No. 1396441 (corresponding to U.S. Pat. No. 3,894,581) together with one or more of the bowl containers 15 which are also usable as weighing and mixing containers in connection with the weighing scale. Such an assembly, convenient for storage and transport purposes, is illustrated in the diagram of FIG. 10 where the reference 100 indicates the body of the weighing scale. As shown in FIG. 1, the frame 10 of the comminuting appliance may have a number of recessess 99 provided around the peripheral edge which serve for engaging and locating projecting feet portions on the weighing scale body 100 when assembled as illustrated in FIG. 10.

Figure 17C:
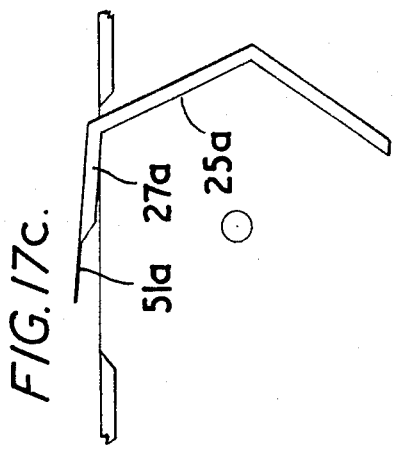
FIGS. 17a, 17b and 17c are diagrams illustrating alternative settings of the drum or turret comminuting member having a slightly modified form of blade cutter in an operative position, the different settings giving different depths of slicing.
Figure 17B:
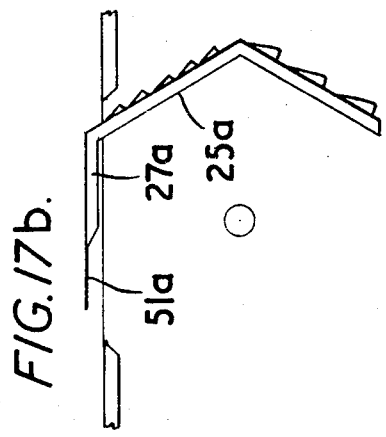
Figure 17A:
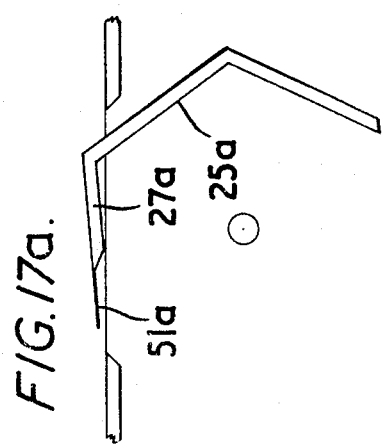
Figure 18:
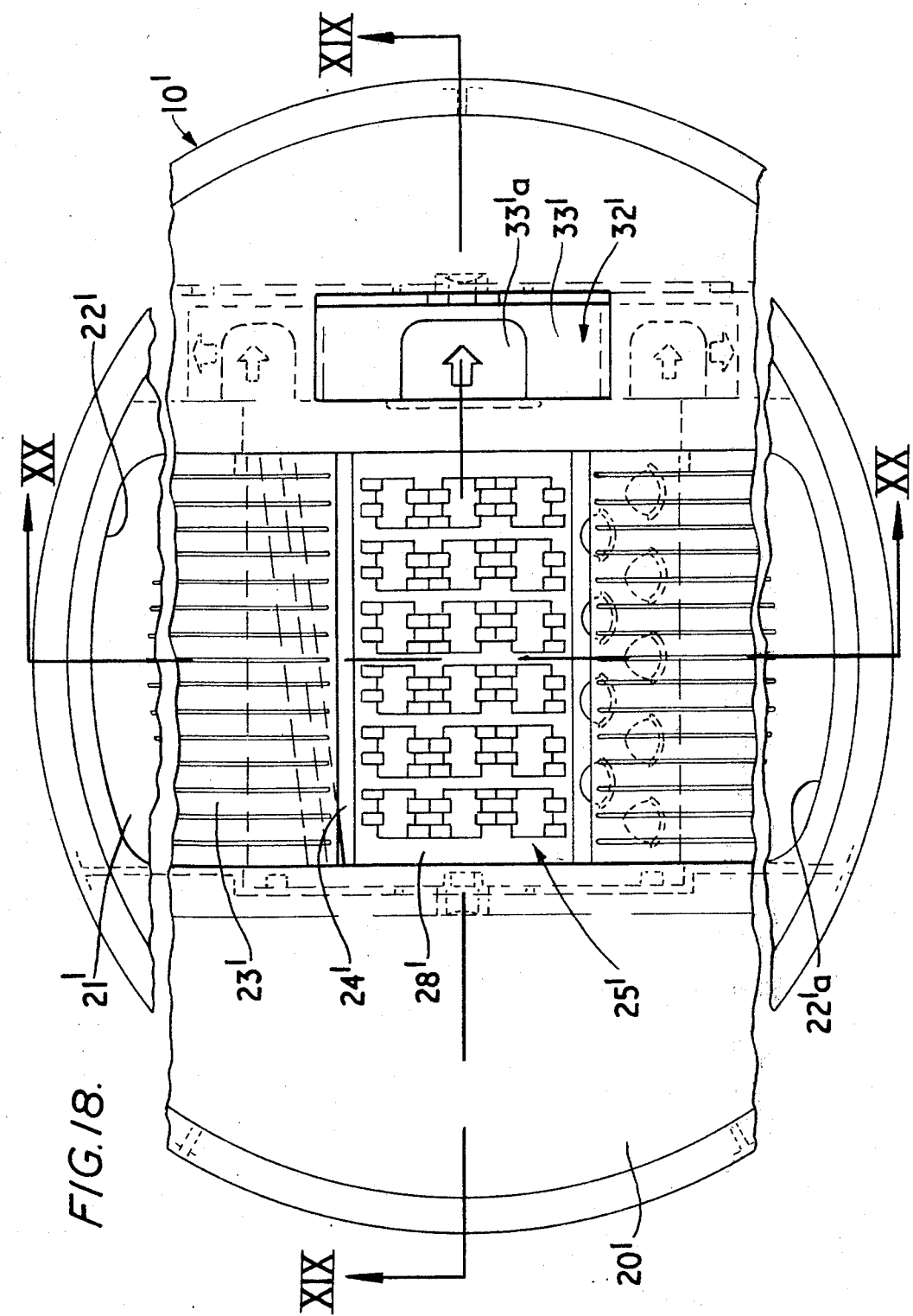
FIG. 18 is a plan view, partially broken away, of a modified structural form of a second embodiment.
Figures 19, 20:
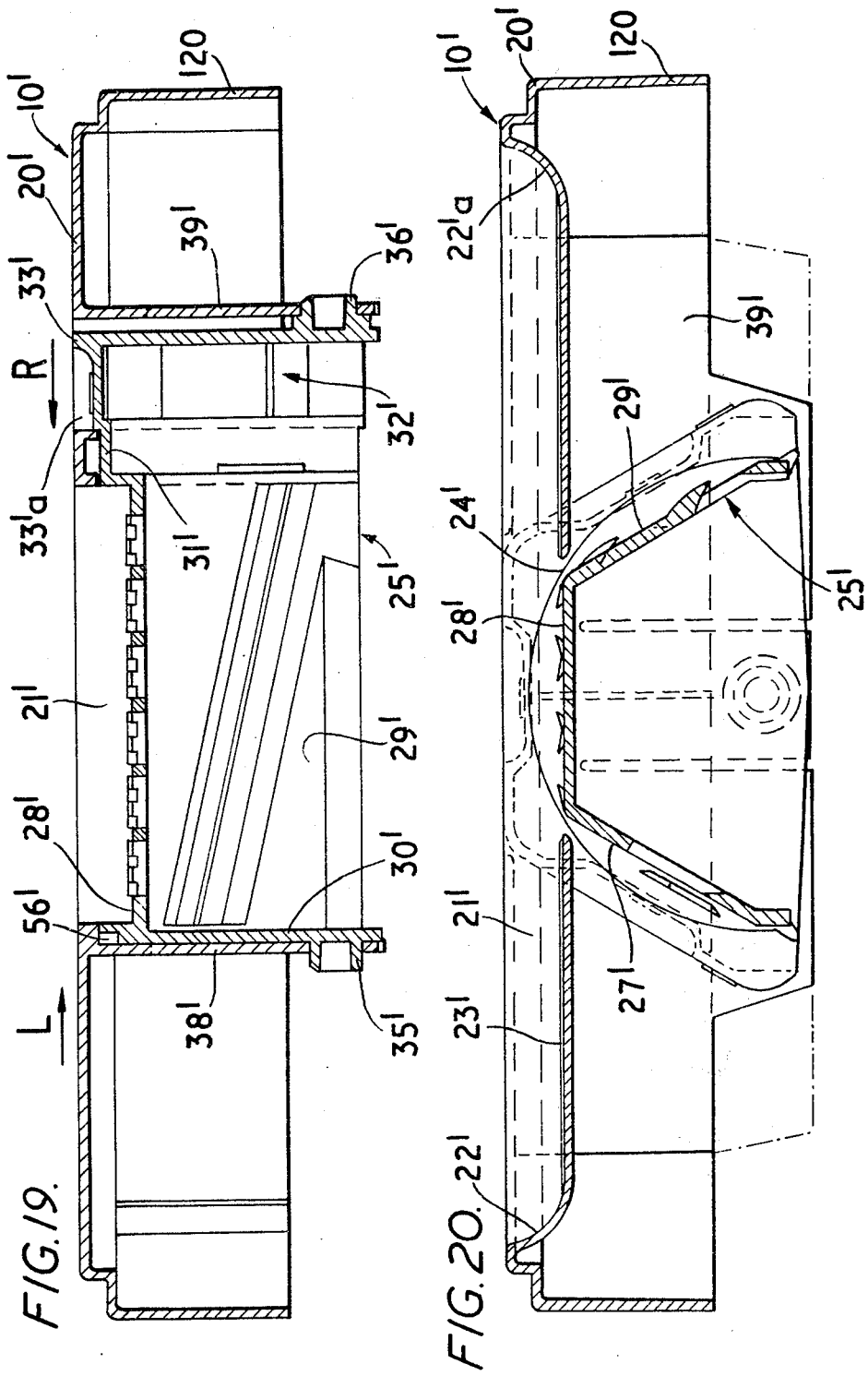
FIG. 19 is a vertical cross-sectional view on line XIX — XIX of FIG. 18.
FIG. 20 is a vertical cross-sectional view on line XX — XX of FIG. 18.
Figure 27:
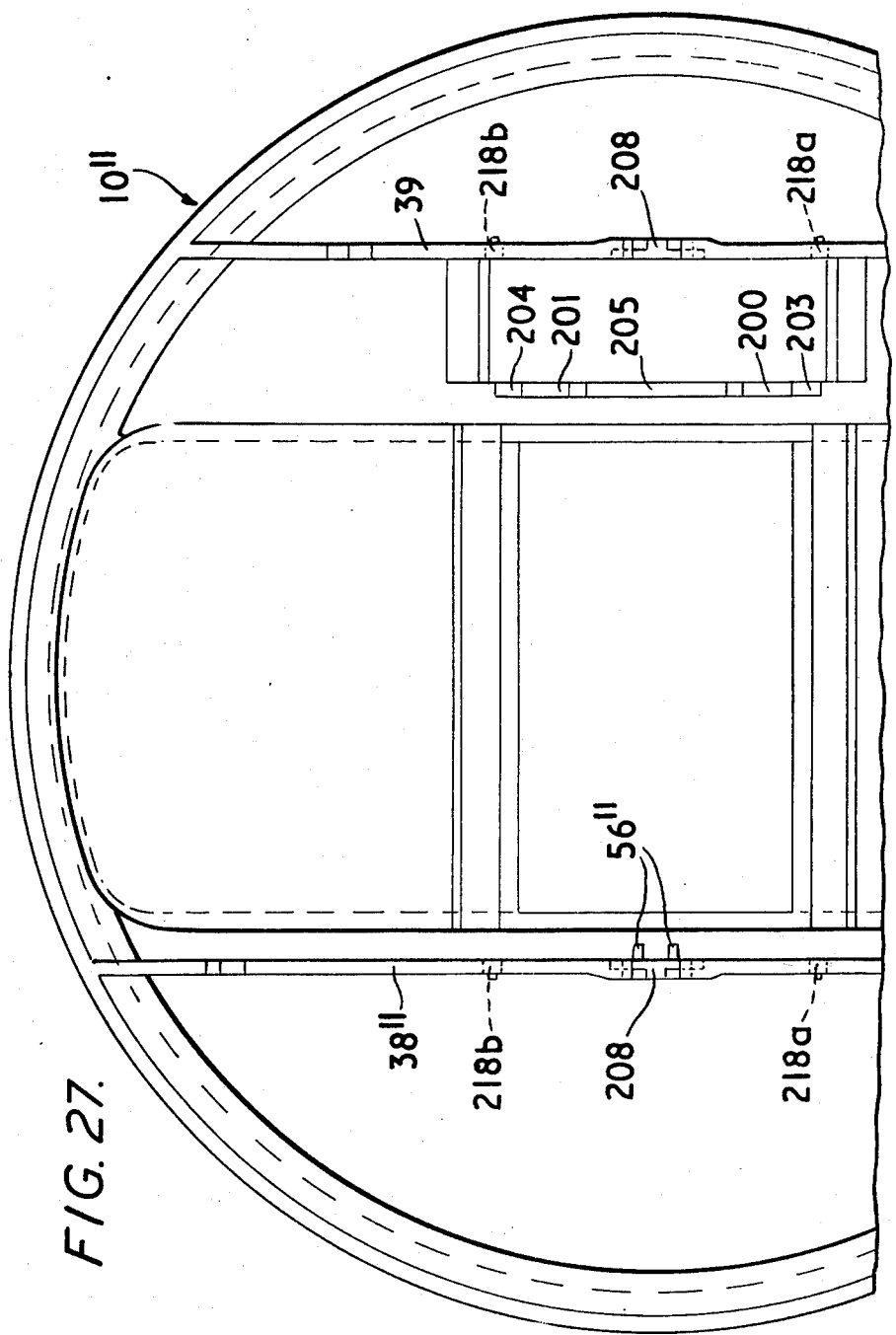
FIG. 27 is a fragmentary underside plan view of the frame component of the structure of the third embodiment with the comminuting member component removed.

If desired, the drum or turret 25a in FIG. 17b, so that a slicer blade 51a projects in the manner of a cantilever from a free edge portion of a shortened facet 27a.

Many other changes and modifications can of course be made in the particular structural details of the appliance described. There are many other constructional possibilities for food grating, shredding and slicing appliances similarly designed for use with a complementary bowl container and designed to give a choice of different working elements.

Thus, referring now to FIGS. 18 to 23, the modified appliance illustrated therein is similar to the appliance shown in FIGS. 1 to 8c, and corresponding parts are denoted by corresponding accented reference numerals, but useful simplifications in the structure are incorporated which facilitate production.

The main modifications concern the form of the frame 10' and mounting and locking arrangement for the drum or turret comminuting member 25'.

Thus, the frame 10', which is again a plastic injection molding, is now formed in one piece without a separate lower base part having the configuration of a hollow cover part 20' with a depending peripheral skirt 120 and open at its underside. Internally, frame 10' has two parallel spaced-apart depending walls 38' and 39' which are slotted to provide central tongue portions 338 and 339 formed with bearing apertures, 238 and 239 respectively, for receibing trunnion or stub axel extensions 35' and 36' of the drum or turret 25'. By reason of their physical form, the tongue portion 338 and 339 can be forcibly and resiliently flexed apart to a limited extent sufficient to provide the clearance required to mount the drum or turret 25' during assembly.

The drum or turret 25' is locked in adjacent position by means of a locking projection 56' integrally projecting from the upper portion of internal wall 38', projection 56 selectively engages one of three locking recesses 57', 58' or 59' formed in the adjacent opposed end wall 30' of the drum or turret (see FIG. 21). As in the first embodiment, the drum or turret 25' has at its righthand end (as viewed in FIG. 19) an integral shaft portion 31' carrying an axial extension providing an integral larger diameter boss 32' having a part-polygonal surface presenting facets 33'. In this embodiment, however, each facet 33' is formed with a finger recess 33'a. To alter the setting of the drum or turret 25' to bring a different facet or comminuting unit 27', 28' or 29', and its associated working comminuting elements, into position in the uppermost operational working position in aperture 24' of the channel guideway 21', a finger is inserted in the recess 33'a of the facet 33' which is exposed through aperture 53'. Finger pressure is applied to displace the drum or turret 25' axially, against resilient flexible yielding of supporting tongue portion 339, to an extent sufficient to disengage and release the locking projection 56' from the respective opposed locking recess. The drum or turret 25' can then be swivelled or turned into its new select angular position, again by finger pressure on a facet of the boss 32'. On reaching the new operational angular position, the drum or turret 25' moves back to its original axial position and locking projection 56'enters into the new respective opposed locking recess 57', 58' and 59'.

Other modifications include a re-arrangement of the different grating or shredding and slicing comminuting working elements of the comminuting units or facets 27', 28' and 29', of the drum or turret 25', and the channel guideway 21' is now closed at both ends by end walls 22' and 22'a. Also, the surface of the base 23' is advantageously formed with a ribbed profile to assist further in providing guidance for the food bodies being comminuting.

In use with a complementary bowl container, it will be understood that the rim of the bowl container will engage the lower edge of the internal walls 38' and 39' which are shaped (see FIGS. 22 and 23) to seat on said rim and also to form locating spigot portions fitting inside the open mouth of the bowl. Otherwise, however, the appliance is substantially the same, and functions in the same manner, as the appliance of the first embodiment.

In the third embodiment illustrated in FIGS. 24 to 30 of the accompanying drawings, the drum or turret comminuting member may be associated with locking means which establishes locking or latching interengagement between the frame and each of its opposite axially-spaced end portions so it has an enhanced rigidity in eahc pre-selected setting during use. And also, the swivel bearings of the drum or turret may incorporate releasable catch or retaining means and be designed so as to permit the drum or turret readily to be removed and, if desired, to be replaced by a different substitute drum or turret comminuting member which may have comminuting units with different comminuting elements providing other comminuting characteristics.

Referring to FIGS. 24 to 30, the third embodiment is generally similar to that of the first and second embodiments, and corresponding parts are denoted by corresponding double accented numerals. The principal modifications concern the drum or turret comminuting member 25'', its locking arrangement and its mounting on the frame 10''.

Instead of being formed completely as a one-piece plastic molding, the drum or turret 25'' comprises two separate end portions formed of plastics material which provide respectively the end wall 30'' and the shaft portion 31'' and boss 32''. A separate intermediate sheet-metal body of part-polygonal configuration is fixed between said end portions. The different facets provide the different comminuting units 27'', 28'' and 29''.

At the left hand end as viewed in FIG. 24, the drum or turret 25'' again has in its end wall 30'' a series of three peripherally spaced locking recesses which are engaged selectively, according to the setting, by locking projections 56'' integrally projecting from the upper portion of internal wall 38'' of the frame 10''. But also, at the right-hand end, the opposite end portion of the drum or turret 25'' has three peripherally spaced pairs of axially inwardly protruding locking projections, 56''a, 56''b and 56''c. One pair engages selectively, according to the setting of the drum or turret 25'', in a pair of locking recesses 200, 201, defined by protruding teeth 203, 204, in a depending internal upper flange or rib 205 of the frame 10'' (see phantom outline in FIG. 26).

Again, at opposite ends the drum or turret 25'' is formed with integral trunnion or stub axle extensions 35'' and 36'' forming parts of swivel bearings by means of which the drum or turret is mounted on the frame 10''. But in this embodiment, internal walls 38'' and 39'' of the frame 10'' are formed with similar key-hole type slots 208, open at the bottom as best seen in FIG. 26. Swivel bearing socket members 210 snap-fit into slots 208 and receive the trunnion or stub axel extensions 35'' and 36''.

Each bearing socket member 210 can be rotated in its respective slot 208 and has a radially-projecting catch arm 212 formed with a shallow protruberance or pip 213 at its outer end. And, a portion of the side wall of each socket member 210 is cut away at one side to provide an open lateral slot 214 which extends through a radial flange 215 around the mouth of each socket member and provides a U-shaped cross-sectional configuration.

Each bearing socket member 210 has two alternative main positions in which the pip 213 engages one or other of two spaced locating holes 218a and 218b in the respective internal wall 38'' or 39'' of the frame and lies adjacent the lower end of one or other of two vertically extending integral ribs 219a and 219b of the respective internal wall which form stops limiting the angular extent of the rotation of each socket member.

In the one position of each bearing socket member, shown in FIG. 24 and FIG. 29 (full lines), the lateral slot 214 is presented upwards. The opposite portion of the side wall lies across and closes the open mouth of the keyhole slot 208 in the respective internal wall of the frame. This is the normal position in use when the drum or turret 25'' is mounted in place. Each respective trunnion projection or stub axle shaft of the latter is then safely locked or retained in the associated bearing socket member 210. But, upon turning each socket member 210 to its alternative position shown in phantom lines in FIG. 29, the slot 214 becomes aligned with the open mouth of the key-hole slot 208 and the trunnion projection or stub axle (36'' or 35'') can be displaced therethrough.

Thus, the drum or turret 25'' can readily be detached and removed from the frame 10'', for example for replacement purposes, simply by turning each bearing socket member 210 to the second mentioned release position. Upon refitting the drum or turret, or another similar drum or turret possibly with different comminuting elements, the socket members 210 are then turned back to the first mentioned locking or retaining position.

Catch arms 212 of the two socket members 210 should preferably project in opposite directions when the socket members are both in their locking or retaining position or are both in their release position. This substantially facilitates manipulation since the two catch arms 212 can simply be grasped by opposite hands and then twisted in opposite directions to operate this releasable locking or retaining catch means associated with the swivel bearing mountings of the comminuting member.

Other minor structural modifications in this third embodiment will be clearly apparent from the drawings. The internal walls 38'' and 39'' of the frame 10'' are not slotted as in the second embodiment to provide resiliently flexible central tongue portions. However, these walls have sufficient resilient flexibility to permit the drum or turret 25'' to be forcibly displaced axially. Finger pressure is applied in a recess 33''a, 33''b or 33''c, of the uppermost exposed of the facet 33'' of the boss 32'', to an extent sufficient to disengage the locking means in order to turn the drum or turret into a different angular position, as in the second embodiment.

Each of the embodiments of FIGS. 31 to 33 in accordance with the invention also includes a frame or body structure adapted to seat and locate upon the rim portion of a bowl container so as to fit over the open mouth thereof. Each structure includes movably mounted comminuting units, providing grating, shredding or slicing comminuting elements, which are positionally interchangeable or adjustable in the frame. Thus they can selectively be brought singly into an exposed predetermined operative position in registry with a through aperture in the frame. When one comminuting unit is in said operative position, each other unit remains in an inoperative position in which it is covered and shielded by part of the frame which forms a protective guard.

In the structure of FIGS. 31a and 31b, three comminuting units comprise perforated or apertured plate portions 120, 121 and 122, provided with grating serrations or teeth of different sizes or with a slicer blade. The units are carried by a comminuting member in the form of a horizontal disc 123 which is rotatably mounted at 124 upon an overlying cover plate 125 of a frame 10b. The frame 10b forms a cover which engages and fits over the open mouth of a bowl 15 which, in use, collects the fragments of comminuting food material produced. The cover plate 125 is sector shaped so as to leave an aperture 126 through which a portion of the disc 123 is exposed, and each comminuting unit 120, 121 and 122 is placed in an operative working position when it is brought to the middle of this aperture 126 by manually turning the disc 123. Suitable handle and releasable locking means (not illustrated) are also provided.

In another modification, different comminuting units may be provided by different regional areas of a plate slidably mounted in a frame structure, such as is indicated in FIGS. 32a to 32c. FIG. 32a shows a perforated plate 130 having two regional areas 131 and 132 provided, respectively, with different sizes of grating serrations or teeth. Plate 130 is slidably mounted in frame 10c so that either area, 131 or 132, can selectively be brought into an operative working position in registry with a central rectangular working aperture 134 in the base of a channel guideway 135 aperture 13 extends across the top of the frame in a direction transverse to the direction of movement of plate 130. FIG. 32b shows a similar plate 130a having three regional areas 131a, and 132a, and 136, the third area 136 being provided with a slicer blade 137. The plates 130 or 130a may be slidably mounted in guides 139 in the structure of frame 10c which, at least in the case of the arrangement of FIG. 32b where the plate 130a is shown as being slidable in the longitudinal direction of channel guideway 135, will lie below the level of the base of said channel guideway 135 as indicated in FIG. 32c. The base of the channel guideway 135 preferably slopes down towards the center as shown. Again, in each case, the frame 10c provides a cover for the open mouth of the bowl 15 and conceals or shields the comminuting units not in use in the operative working position.

FIG. 33 shows another arrangement in which the different comminuting units are provided by separate perforated or apertured plates 140, 141, 142, 143 which carry different serrations, teeth or blade cutter means and which are independently slidably mounted in guides (not shown) in a frame 10d. Thus, each can be selectively moved individually (e.g. by suitable projecting handle means) between ou-of-use inoperative positions (indicated in broken lines), and an operative position in registry with a central working aperture 145 in the base of a recessed transverse channel guideway 146. Again, the frame 10d is designed to engage and fit over a bowl 15 as in the other embodiments.

In the above embodiments, the frame, preferably molded in plastic material, is formed with a transverse channel guideway in the top surface and the food bodies to be comminuted may conveniently be held and reciprocated in the guideway by using an appropriate food holder pad as herein before described.

What I claim is:

1. A device for use in comminuting solid food bodies by rasping, grating or cutting carried out by manually moving each food body under pressure over a stationary comminuting unit, said device comprising:
    a. a comminuted food material collector bowl;
    b. a lid structure which detachably fits upon and covers said bowl;
    c. a channel extending across said lid structure defining a food body guideway bounded by lateral guide surfaces and a base surface integral with said lid structure;
    d. a slot aperture in the base surface of said channel guideway intermediate its ends;
    e. at least three different comminuting units of substantially planar configuration movably mounted and housed in said lid structure, said different comminuting units having comminuting elements of different comminuting characteristics and each having apertures for passage therethrough of comminuted food material fragments; and
    f. means for selectively presetting each comminuting unit by displacement within said lid structure from a protectively shielded out-of-use position to an exposed operative working position in registry with said slot aperture in the channel guideway ready for use.

2. A device according to claim 1, which further includes a food body holder pad adapted to engage and locate with a channel guideway defined by said guide surfaces, whereby the food bodies can be manually reciprocated along said guideway by pressure applied indirectly through said holder pad.

3. A device according to claim 1, wherein the comminuting units are provided by integral portions of a single common comminuting member in the form of a drum rotatably mounted upon the frame by swivel bearings, said drum having a hollow shell structure of arch-like part-polygonal cross-sectional configuration providing substantially flat facets extending in planes disposed in angular relationship to one another, said facets carrying the different comminuting elements and constituting said comminuting units each adapted to lie in the operative working position across the working aperture in the path of the food bodies when the drum is turned to bring each said facet uppermost.

4. A device according to claim 3, wherein the angular relationship between the facets providing the comminuting units is such that any one of the comminuting units can selectively be moved into the uppermost operative position by turning the drum through an angle substantially less than 180°.

5. A device according to claim 3, wherein the drum has a total of three comminuting units formed by three facets in substantially 120° equiangular relationship.

6. A device according to claim 3, wherein the comminuting member and the frame are formed as single one-piece plastics mouldings, and the swivel bearings are integral therewith.

7. A device according to claim 3, which includes releasable locking means to hold and maintain the comminuting member in each said selected angular position, said locking means comprising inter-engageable latching elements on the drum and frame respectively, and digitally manipulatable means are provided operable by finger pressure to simultaneously turn the drum into a new adjusted angular position and to displace said latching elements against an opposing resilient biassing force to effect disengagement and release of the locking means in a single one-handed operation by the user.

8. A device according to claim 3, which further includes releasable locking means to hold and maintain the comminuting member in each said selected angular position, said locking means comprising complementary latching projecting and recess means on the comminuting member and frame, and wherein the frame is provided with at least one flexibly resilient support part supporting the comminuting member and permitting the comminuting member to be displaced axially by end pressure to engage and disengage said locking means.

9. A device according to claim 1, wherein the comminuting units are of perforated plate-like form disposed and mounted horizontally in said frame in substantially co-planar relationship, each said comminuting unit being selectively movable within its own plane into the exposed operative working position.

10. A device according to claim 9, wherein the comminuting units comprise separate perforated plates and the frame has guides in which said plates are independently slideably mounted for movement individually between the operative working position and respective shielded out-of-use inoperative positions.

11. A device according to claim 9, wherein a plate is provided, constituting a single common comminuting member, movably mounted in the frame, different regional areas of said plate forming said comminuting units.

12. A device according to claim 11, wherein the frame has guides in which said plate forming the common comminuting member is slidably mounted to enable the individual comminuting units to be selectively moved into said operative working position.

13. An appliance for comminuting solid food bodies by rasping, grating or slicing carried out by manually reciprocating each food body along a guideway so as to pass under pressure over a stationary comminuting unit so that the comminuted food material drops through apertures therein, said device comprising:
  a. a frame,
  b. a food guideway provided in a top surface of said frame,
  c. a working aperture in said top surface in alignment with said guideway, and
  d. a plurality of comminuting units having different comminuting elements of different comminuting characteristics,
  e. said comminuting units being provided by a comminuting member rotatably mounted on said frame whereby the comminuting member can be turned into selected angular positions relative to the frame to bring selectively each comminuting unit into an uppermost operative position disposed in the path of the food bodies reciprocated along said guideway and in registry with said working aperture,
  f. the appliance also including releasable locking means operative to hold and maintain the comminuting member in each said selected angular position,
  g. the comminuting member consists of a drum mounted upon the frame by swivel bearings at opposite ends and having a hollow shell structure of arch-like part-polygonal across-sectional configuration providing substantially flat facets extending in planes disposed in angular relationship to one another,
  h. said facets carrying different comminuting elements and constituting said comminuting units,
  i. each facet being adapted to lie in the uppermost operative position, across the working aperture, in substantially flush relationship with said guideway which extends either side of said working aperture.

14. A device according to claim 13, wherein the frame has a top portion provided with a recessed channel constituting said guideway, and said device further includes a food body holder pad adapted to engage and locate with said channel guideway whereby the food bodies can be reciprocated along said guideway by pressure applied indirectly through said holder pad.

15. An appliance as claimed in claim 13, wherein the swivel bearings incorporate releasable catch or retaining means operable selectively so as either to retain the comminuting member in place in the frame or to enable the comminuting member to be detached from the frame whereby the comminuting member can readily be replaced with a substitute comminuting member which may have comminuting units with different comminuting elements providing other comminuting characteristics.

16. An appliance according to claim 15, in combination with a receptacle provided for collecting the comminuted material, said receptacle having an open top and said frame being adapted to fit upon and form a cover for said open top.

17. An appliance according to claim 13, wherein the comminuting member comprises three said comminuting units of which adjacent units are disposed at an angle, relative to one another, within the range 100° to 140°.

18. An appliance according to claim 13, wherein the comminuting member is supported upon the frame by at least one flexibly resilient support part which permits the comminuting member to be displaced axially to engage and disengage the locking means when said comminuting member is swivelled to bring a different selected comminuting unit into said operational working position, said locking means comprising complementary projection and recess means on the comminuting member and frame which provide a locking or retaining action for each corresponding angular position of the comminuting member.

19. An appliance as claimed in claim 13, wherein the swivel bearings incorporate releasable catch or retaining means operable selectively so as either to retain the comminuting member in place in the frame or to enable the comminuting member to be detached from the frame whereby the comminuting member can readily be replaced with a substitute comminuting member which may have comminuting units with different comminuting elements providing other comminuting characteristics.

20. An appliance as claimed in claim 13 wherein the frame is provided with a guiding track for the solid food bodies to be comminuted, said guiding track extending either side of the working aperture.

21. A combination comprising:
  a. a food comminuting unit having a frame structure including a substantially flat food comminuting surface on one side and a shaped outlet means on the other side thereof; and
  b. a receptacle including a shaped opening having structural characteristics to detachably fit the shaped outlet means of the food comminuting unit;
  c. said frame structure being effective to cover said receptacle when the shaped receptacle opening is fitted to the shaped outlet means;
  d. said food comminuting surface including a working aperture;
  e. said food comminuting unit including at least two comminuting elements movably mounted on the frame structure between an operative working position and a stored position;
  f. each said comminuting element being registered with the working aperture in the exposed operative working position and being covered by the frame structure in the protectively shielded stored position;
  g. each said comminuting element having a substantially planar configuration with openings therethrough to effect passage of comminuted food material when the combination is in operation;
  h. said comminuting unit further including means disposed on said frame structure for moving the comminuting elements between the working position and a stored position.

22. A combination according to claim 21 wherein the food comminuting surface has a recessed base food guide surface bounded by lateral guide surfaces, the working aperture being located in the base food guide surface.

23. The combination according to claim 22 wherein a food holder has a structural configuration to engage and located between the lateral guide surfaces, said food holder being effective to be disposed over food to be comminuted by being manually reciprocated under presssure along the recessed base food guide surface.

24. The combination according to claim 21 wherein said comminiting unit includes a rotatably mounted drum shaped comminuting member incorporating said comminuting elements, said comminuting element moving means being effective for rotating the comminuting member in single one-handed operation by the user to a preselected angular position for exposing a comminuting element in the working aperture.

25. A combination according to claim 24 wherein releasable blocking means hold and maintain the comminuting member in each said selected angular position.

26. A combination according to claim 25 wherein the locking means comprises interengageable latching elements on the drum shaped element and frame structure, respectively, said latching elements being maintained in position by an opposing resilient biasing force, digitally manipulatable means is effective to displace said latching elements against said biasing force to effect disengagement and release of the locking means in a single one-handed operation by the user and further effective to simultaneously turn the drum shaped comminuting member to a preselected angular position.

27. A combination according to claim 25 wherein said locking means comprises complementary latching projection and a recess means on the comminuting member and frame structure, said frame structure including at least one flexibly resilient support part for supporting the comminuting member and permitting the comminuting member to be displaced axially by end pressure to engage and disengage said locking means.

28. A combination as defined in claim 24 wherein said comminuting element moving means includes swivel bearings on which said drum shaped comminuting member is mounted, said comminuting member having a hollow shell structure of arch-like polygonal cross-sectional configuration including said planar cutting elements having substantially flat facets extending in planes disposed in angular relationship with respect to each other, said facets each being adapted to lie in the operative working position within the working aperture in the path of the food when the drum shaped comminuting element is turned to bring each said facet within said working aperture.

29. A combination as defined in claim 28 wherein said angular relationship between the facets is substantially less than 180° and sufficient to provide the capacity to selectively move the comminuting elements into an operative position within the working aperture.

30. A combination according to claim 28 wherein the drum shaped comminuting element has a total of three comminuting planar elements in substantially 120° equiangular relationship with respect to each other.

31. A combination according to claim 28 wherein a comminuting member and frame structure are formed as a single one-piece molding, and the swivel bearings are integral with said one-piece molding.

* * * * *